United States Patent [19]

Cramer et al.

[11] Patent Number: 5,420,230
[45] Date of Patent: May 30, 1995

[54] AMIDATION CATALYST CONCENTRATES

[75] Inventors: Gregory D. Cramer; Ramdas Dujari, both of Seaford; Robert C. Wheland, Wilmington, all of Del.

[73] Assignee: E. I. Du Pont de Nemours and Company, Wilmington, Del.

[21] Appl. No.: 124,142

[22] Filed: Sep. 20, 1993

[51] Int. Cl.$^6$ .............................................. C08G 69/48
[52] U.S. Cl. ................................. 528/336; 528/310; 528/322; 525/419; 525/420
[58] Field of Search .................... 528/336, 322, 310; 525/420, 419

[56] References Cited

U.S. PATENT DOCUMENTS

| | | | |
|---|---|---|---|
| 3,551,548 | 12/1970 | Brignac et al. | 264/234 |
| 3,763,113 | 10/1973 | Burrows et al. | 525/920 |
| 4,848,915 | 8/1992 | Fintel | 366/76 |
| 4,912,175 | 3/1990 | Wheland et al. | 525/420 |
| 4,919,872 | 4/1990 | Fintel | 264/103 |
| 5,116,919 | 5/1992 | Buzinkai et al. | 525/420 |
| 5,142,000 | 8/1992 | Wheland | 525/420 |

FOREIGN PATENT DOCUMENTS 410230   7/1990   European Pat. Off. .

*Primary Examiner*—Morton Foelak
*Assistant Examiner*—P. Hampton-Hightower

[57] ABSTRACT

Disclosed is a process for preparing nylon by adding an amidation catalyst concentrated in "masterbatches" to the process melt resulting in a product with increased molecular weight and viscosity.

10 Claims, No Drawings

AMIDATION CATALYST CONCENTRATES

FIELD OF THE INVENTION

This invention concerns a process for making nylon 66 and related polyamides comprising adding to the process melt one or more amidation catalysts that is/are concentrated in a "masterbatch" made by concentrating the catalyst in nylon 66. The addition of such a masterbatch to the polyamide melt results in a product with increased molecular weight and viscosity, with reduced gel formation.

TECHNICAL BACKGROUND OF THE INVENTION

Nylon 66, useful for making fibers, is currently made by batch or continuous processes wherein low molecular weight primary polyamide is converted to higher molecular weight secondary polyamide in a multi step polymerization process; such process is termed "amidation". A general amidation process is described in U.S. Pat. No. 3,763,113. High molecular weight and viscosity of the polyamide product are often desirable where strength and tenacity are important. See U.S. Pat. No. 3,551,548, column 1, lines 47–49. To achieve this result, an amidation catalyst, such as phenylphosphinic acid, 2-(2'-pyridyl) ethylphosphonic acid, or sodium hypophosphite, may be added to the starting salt strike, at a concentration of about 1 to 10 moles of amidation catalyst for every million grams of polymer (moles/$10^6$ g). See U.S. Pat. No. 4,912,175.

The present invention teaches an alternate approach for increasing the molecular weight and viscosity of the product, involving adding a concentrate of the amidation catalyst(s) in nylon 66, hereafter called a "masterbatch", to the primary polyamide melt. Advantages of adding catalyst later in the process, rather than to the starting salt strike, include decreasing the transition time from one product to the next in a continuous process, decreasing expenses, since masterbatch addition can take the place of a separate solid phase polymerization step, improving spinning control since masterbatch addition can have a nearly immediate effect on threadline properties such as tension, and decreasing degradation.

European Patent Application No. 410,230 (Bayer AG), filed Jul. 13, 1990, describes a process for the manufacture of high molecular weight polyamide wherein at least one concentrate (masterbatch) is melt blended into catalyst-free polyamide and then the molecular weight of the blend is increased by solid phase polymerization. This application claims a wide range of thermoplastic matrices from polyamides to polyethylene and a wide range of catalysts. However, the amino and pyridyl phosphonicacids are not mentioned. Catalyst concentrations from 0.05 to 20 wt % preferably 0.2 to 10 wt % are claimed for the "masterbatches" Experimental examples are limited to matrices such as 6 nylon and polyethylene which do not generally show nylon 66's tendency towards gelation.

U.S. Pat. No. 3,551,548 discloses a process for the manufacture of fibers with increased relative viscosity by the addition of phosphorus compounds. The examples disclose that increased molecular weights are obtained with the simultaneous application of a vacuum and heat.

2-(2'-Pyridyl)ethylphosphonic acid (PEPA) and its diethyl ester (DPEP) have been claimed as amidation catalysts (U.S. Pat. No. 4,912,175), giving decreased thermal degradation in the presence of base (U.S. Pat. No. 5,116,919), and as amidation catalysts preserving catalytic activity in the presence of alumina containing $TiO_2$ (U.S. Pat. No. 5,142,000). U.S. Pat. No. 4,912,175, column 7, line 48 discloses PEPA's relatively low activity with respect to crosslinking during the amidation process. For example, under conditions where PEPA formed 2.5 moles of branches/$10^6$ g of polymer (Example 8, U.S. Pat. No. 4,912,175) phenylphosphinic acid formed 4 moles of branches/$10^6$ g of polymer (Comparative Example 1, U.S. Pat. No. 4,912,175).

SUMMARY OF THE INVENTION

This invention relates to a process for using a concentrated amidation catalyst "masterbatch" prepared from catalyst and nylon 66, for addition to the melt in a nylon 66 production process conducted in an autoclave or a continuous process.

In a process for the manufacture of nylon, wherein lower molecular weight primary polyamides are converted to higher molecular weight secondary polyamides by melt blending these primary polyamides with one or more amidation catalysts, the improvement consists of adding to the primary polyamide melt at least one catalyst masterbatch manufactured from an amidation catalyst mixed with nylon 66. The masterbatch is then blended into the process melt.

The invention also concerns a catalyst melt comprising a masterbatch consisting of amidation catalyst in a nylon 66 matrix and a polyamide selected from:

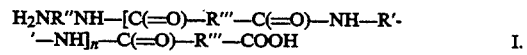  I.

or

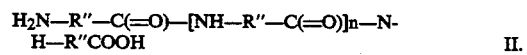  II.

wherein R" is selected from the group consisting of linear or branched alkylene groups containing from 2 to 12 carbon atoms and R''' is selected from the group consisting of linear or branched alkylene groups containing 2 to 12 carbon atoms and, in structure I, aromatic groups.

DETAILS OF THE INVENTION

Concentrated catalyst prepared as masterbatch can be stored prior to use.

Catalysts that can be used in the present master-batch process are 2-(2'-pyridyl) ethylphosphonic acid, 2-aminoethylphosphonic acid, $X(CH_2)_nPO_3R_2$, wherein X is selected from 2-pyridyl, $—NH_2$, $—NHR'$, and $—NR'_2$, n=2 to 5, R and R' independently are H or alkyl, and at the lower limits of the concentration ranges taught herein, sodium hypophosphite and aromatic acids based on phosphorus such as phenylphosphinic acid. The amino and pyridylphosphonic acid catalysts are preferred for avoiding gelation and giving convenient relative viscosities. After blending, the concentration of catalyst in the masterbatch melt is preferably at a 100 to 400 moles catalyst/$10^6$ g polymer, most preferably 100–200 moles of catalyst/$10^6$ g of nylon.

Catalyst masterbatches are prepared in several ways. One method is by melting together catalyst and additive-free nylon flake. A second method is by the addition of catalyst to an aqueous nylon 66 salt strike.

A number of factors determine the optimum catalyst concentration in the masterbatch. If catalyst used is too dilute, the amidation process will be inefficient as large amounts of "masterbatch" are required to make relatively small amounts of product. To preserve efficiency, catalyst concentrations of at least 100 to 200 moles/$10^6$ g nylon are most often required. If catalyst is too concentrated, uniformity will be lost when increasingly small amounts of masterbatch can no longer be metered in accurately.

Various methods, including strand feed (see U.S. Pat. Nos. 4,848,915 and 4,919,872, which are incorporated herein by reference, for a general description of strand feeding) and flake feed, are used for feeding concentrated catalyst (masterbatch) into the process. It is anticipated that strand feed will prove more accurate than flake feed, making it possible to use "masterbatches" with concentrations of more than 200 moles of catalyst/$10^6$ g. However, with some catalysts, increasing catalyst levels above 100 to 200 moles/$10^6$ g may cause undesirable gelation, raise viscosity, or lower viscosity to such an extent that masterbatch and nylon do not blend easily and uniformly. Use of amino phosphonic acid and pyridyl phosphonic acid catalysts avoids gelation and gives convenient master-batch relative viscosities (RV's) around 20 to 65, preferably about 30 to 50.

By relative viscosity is meant the ratio of solution and solvent viscosities measured in a capillary viscometer at 25° C. The solvent is formic acid containing 10% by weight water. The solution is 8.4% by weight polyamide dissolved in solvent.

For purposes of initial masterbatch blending, the similar molecular weight distributions of the PEPA containing and additive free nylons provide for easier, more uniform blending than with the $H_3PO_4$ containing nylons. Also, nylon 66's containing PEPA are easier to spin than $H_3PO_4$ containing polymer having a very high molecular weight gelled and/or branched fraction, that cannot be readily spun for extended periods without equipment fouling and plugging. Gel formation becomes troublesome for some inorganic acids ($H_3PO_4$ and $NaH_2PO_2$), aromatic phosphonic and phosphinic acids (phenylphosphonic and phenylphosphinic acid), and heteroatom substituted aliphatic phosphorus based acids (3-hydroxypropylphosphinic acid) catalysts when their concentrations in nylon 66 exceed about 100 to 200 moles/$10^6$ g. Gelled polymer does not blend uniformly and plugs filters in spinning operations. Most common amidation catalysts are thus unsuitable for making masterbatches at concentrations much over 100 moles/$10^6$ g. Pyridyl and amino substituted aliphatic phosphonic acids avoid gelation and perform well at higher masterbatch concentrations. The fact that DPEP and PEPA do not encourage gelation allows much higher concentrations of catalyst to be prepared in a nondegraded nylon 66 matrix and constitutes a major difference and advantage between the present process and the art.

Certain of the described catalysts (e.g., the aromatic phosphonic acid catalysts) are able to give useful masterbatches and avoid gelation only at lesser concentrations. 3-Phenylpropylphosphonic acid does not gel nylon 66, giving 28 and 57 RV polymer when blended in at 100 and 200 moles/$10^6$ g respectively.

By "lower molecular weight primary polyamides", the starting materials for process of the present invention, are meant polyamides such as nylon 66 having from 20 to 60 relative viscosity.

By "higher molecular weight secondary polyamides", the products of the process of the present invention, are meant polyamides such as nylon 66 having a relative viscosity higher than that of the starting material employed, this RV is normally in the range of from 40, if for example the starting material had an RV of 20, to about 150 relative viscosity, preferably 50 to 90 relative viscosity herein.

PREPARATION OF CATALYST MASTERBATCHES

Catalyst masterbatches in the Examples have been prepared in two ways: first by melting together catalyst and additive-free nylon flake as exemplified by Examples 1 through 7 in Table 1 and, second, by the addition of catalyst to an aqueous nylon 66 salt strike as exemplified by Examples 8 and 9 in Table 2. The results of masterbatch preparations using 2-aminoethylphosphonic acid (AEP) and PEPA are summarized in Table 1 below. Above about 200 moles/$10^6$ g, gel particles occasionally interfered with RV measurements and experiments had to be rerun. In spite of occasional gel particle formation, the melts overall became increasingly fluid with increased catalyst concentration, something readily apparent visually around 400 moles/$10^6$ g and confirmed by lowered RV's.

EXAMPLES

EXAMPLE 1

Masterbatch by Addition of Catalyst to Preformed Nylon, 100 moles of 2-(2'-Pyridyl)ethylphosphonic acid/$10^6$ g A Pyrex ® tube 200 mm long and 28 mm in inside diameter was loaded with 2 milliliters of water, 0.187 g of 2-(2'-pyridyl)ethylphosphonic acid (PEPA) for a concentration of 100 moles of PEPA/$10^6$ g of polymer, and 10 grams of additive free nylon 66 (Zytel ® 101). The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. The steam was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 5.9 g of coarse powder which was found to have a relative viscosity of 59.

TABLE 1

| PEPA ADDED TO PREFORMED NYLON CONDITIONS OF EXAMPLE 1 | | | |
|---|---|---|---|
| EXAMPLE | MOLE/$10^6$ g | WEIGHT RECOVERED | FINAL RV |
|  | 0 | 7.9 | 62 |
| 1 | 100 PEPA* | 5.9 | 59 |
| 1 | 200 PEPA* | 6.8 | 54 |

TABLE 1-continued
PEPA ADDED TO PREFORMED NYLON CONDITIONS OF EXAMPLE 1

| EXAMPLE | MOLE/$10^6$ g | WEIGHT RECOVERED | FINAL RV |
|---|---|---|---|
| 3 | 300 PEPA* | 8.5 | 36 |
| 4 | 350 PEPA* | 7.5 | 22 |
| 5 | 400 PEPA* | 9.9 | 18 |
| 6 | 800 PEPA* | 9.6 | 12 |
| 7 | 200 AEP** | 8.8 | 17 |

*PEPA, 2-(2'-pyridyl)ethylphosphonic acid
**AEP, 2-aminoethylphosphonic acid

As an alternate method of concentrate preparation, catalyst was added to salt strike in an autoclave, the experiment is fully described as Example 9. Results with different concentrations of DPEP are summarized in Table 2 below.

TABLE 2
DPEP ADDED TO AQUEOUS 66 NYLON SALT UNDER CONDITIONS OF EXAMPLE 9

| EXAMPLE | DPEP, MOLES $10^6$ g | FINAL RV |
|---|---|---|
|  | 0 | 46* |
| 8 | 100 | 41 |
| 9 | 200 | 28 |

*Similar polymerization conditions but in a smaller clave (5.7 gallons) making only about 10 lbs of polymer Comparing Tables 1 and 2 it can be seen that polymer RV decreases with increasing PEPA and DPEP concentrations, whether the PEPA is added to preformed nylon flake (Table 1) or DPEP is added to aqueous salt solution (Table 2). The similar behavior of PEPA and DPEP reflects the fact that DPEP hydrolyses to PEPA during the course of polymerization so that in fact the same catalytic species is present in both experiments. Experimental evidence for this hydrolysis is described in Experiment #1. When two polymer samples are blended, as for example masterbatch with additive-free nylon, blending is most efficient when the two polymers have approximately the same viscosity. When viscosities fall very low, as for example the RV of 9 in Experiment #1, it becomes hard both to process the product as a polymer and to blend it in with polymers of normal viscosity. The use of vacuum to rebuild relative viscosity from 18–28 to 55–65 is illustrated for the addition of PEPA to preformed polymer in Example #10 and for the addition of DPEP to aqueous nylon 66 salt in Example #11.

COMPARATIVE EXAMPLES

Other common amidation catalysts such as phosphoric acid, phenylphosphinic acid and sodium hypophosphite cause nylon 66 to gel when added at concentrations around 100 to 200 moles/$10^6$ g. Examples of gelation caused by common catalysts are given in Table 3 below.

TABLE 3
CATALYSTS GELLING PREFORMED NYLON UNDER CONDITIONS OF COMPARATIVE EXAMPLE 2

| Comp. Ex. | Catalyst | Moles/$10^6$ g | RV |
|---|---|---|---|
| 1 | Phenylphosphinic Acid | 100 | 50 |
| 2 | Phenylphosphinic Acid | 200 | gel |
| 3 | Phenylphosphonic Acid | 100 | 124 |
| 4 | Phenylphosphonic Acid | 200 | gel |
| 5 | Sodium Hypophosphite | 100 | 73 |
| 6 | Sodium Hypophosphite | 200 | gel |
| 7 | Phosphoric Acid | 100 | gel |
| 8 | Phosphoric Acid | 200 | gel |
| 9 | 3-Hydroxypropylphosphinic Acid* | 100 | gel |
| 10 | 3-Hydroxypropylphosphinic Acid* | 200 | gel |

*3-Hydroxypropylphosphinic acid added as its cyclic ester

Using masterbatches of the type prepared for Table 2, masterbatches have been blended into generic, additive-free nylon in an extruder and a useful catalytic increase in RV has been observed.

Four additional experiments illustrating this point are described below as Experiments #2 through #5. Experiments #2 and #3 illustrate the use of masterbatches prepared by adding DPEP to aqueous salt and preformed nylon respectively, Experiment #4 establishes that catalysis can still be observed when a catalyst such as DPEP is combined with other common nylon additives such as potassium bicarbonate, and Experiment #5 shows that masterbatches prepared in nylon 66 can be used to catalyze the polymerization of 6 nylon.

COMPARATIVE EXAMPLE 2

Gelation of 66 Nylon Caused by Common Catalysts 200 Moles/$10^6$ g Phenylphosphinic Acid A Pyrex® tube 200 mm long and 28 mm in inside diameter was loaded with 2 milliliters of water, 0.282 g of phenylphosphinic acid for a concentration of 200 moles of phenylphosphinic acid/$10^6$ g of polymer, and 10 grams of additive free nylon 66 (Zytel® 101). The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. The steam was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 2.0 g of coarse powder which did not dissolve completely (gel particles) for purposes of RV measurement.

EXPERIMENT #1

Hydrolysis of DPEP to PEPA

A Pyrex® tube 200 mm long and 28 mm in inside diameter was loaded with 2 milliliters of water, 1.94 g of diethyl 2-(2-pyridyl)ethylphosphonate (DPEP) for a concentration of 800 moles of DPEP/$10^6$ g of polymer, and 10 grams of additive free nylon 66 (Zytel® 101). The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 5 minutes at 282° C. under 760 mm of steam. The steam was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 10.0 g of coarse powder which was found to have a relative viscosity of 9. A sample of this polymer was dissolved in formic acid. Phosphorus NMR's taken of this solution and its mixture with genuine samples of PEPA and DPEP, established that all starting DPEP had been hydrolyzed to PEPA in the course of blending DPEP into molten nylon.

EXPERIMENT #2

Use of Masterbatch Containing 200 Moles/$10^6$ g of DPEP Diluted to 10 moles/$10^6$ g By Blending A Pyrex® tube 200 mm long and 28 mm in inside diameter was loaded with 2 milliliters of water, 0.50 g of autoclave masterbatch made with 200 moles of DPEP/$10^6$ g of polymer (Example 11, RV=65), and 9.5 grams of additive free nylon 66 (Zytel® 101) diluting the concentration of DPEP/PEPA down to 10 moles/$10^6$ g of nylon. The top of the tube was sealed with a reactor head made by Lab-Crest Scientific that was fitted with gas ports, a syringe port, and a helical stirrer. After flushing the contents of the tube for 5-minutes with argon, the bottom 6 to 7-inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. A vacuum of 200 mm was pulled. Ten minutes later the 200 mm vacuum was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 5.4 g of coarse powder which was found to have a relative viscosity of 152. Under the same conditions an additive free nylon sample finished at 88 RV making the net catalytic effect of the masterbatch +64 RV units.

EXPERIMENT #3

Use of Masterbatch Containing 200/$10^6$ g moles of DPEP Diluted to 10 moles/$10^6$ g by Blending A Pyrex® tube 200 mm long and 28 mm in inside diameter was loaded with 2 milliliters of water, 0.50 g of 51 RV masterbatch made by blending DPEP into additive-free nylon (Zytel® 101) at a concentration of 200 moles of DPEP/$10^6$ g, and 9.5 grams of additive-free nylon 66 (Zytel® 101) diluting the concentration of DPEP/PEPA down to 10 moles/$10^6$ g of nylon. The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. A vacuum of 200 mm was pulled. Ten minutes later the 200 mm vacuum was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 4.1 g of coarse powder which was found to have a relative viscosity of 163. Under the same conditions an additive free nylon sample finished at 88 RV making the net catalytic effect of the masterbatch +75 RV units.

EXPERIMENT #4

Use of Masterbatch Containing 200 moles of DPEP/$10^6$ g and 400 moles KHCO$_3$/$10^6$ g Diluted 40× by Blending A Pyrex® tube 200 mm long and 28 mm in inside diameter was loaded with 2 milliliters of water, 0.25 g of 18 RV masterbatch made by blending 200 moles of DPEP/$10^6$ g and 400 moles of KHCO$_3$/$10^6$ g into Zytel® 101, and 9.5 grams of additive-free nylon 66 (Zytel® 101) diluting the concentration of DPEP/PEPA down to 5 moles/$10^6$ g of nylon. The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. A vacuum of 200 mm was pulled. Ten minutes later the 200 mm vacuum was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 4.3 g of coarse powder which was found to have a relative viscosity of 132. Under the same conditions an additive free nylon sample finished at 88 RV making the net catalytic effect of the masterbatch +44 RV units.

EXPERIMENT 5

Use of Masterbatch Containing 200 moles of DPEP/$10^6$ g in 66 Nylon Diluted to 10 moles/$10^6$ g by Blending, Catalyst in 6 Nylon A Pyrex ® tube 200 mm long and 28 mm in inside diameter was loaded with 2 milliliters of water, 0.50 g of 29 RV autoclave masterbatch made with 200 moles of DPEP/$10^6$ g of polymer, and 9.5 grams of 6 nylon (Capron ® 8207F, Allied Signal Inc.) diluting the concentration of DPEP/PEPA down to 10 moles/$10^6$ g of nylon. The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. A vacuum of 200 mm was pulled. Ten minutes later the 200 mm vacuum was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 5.4 g of coarse powder which was found to have a relative viscosity of 104. A 6 nylon sample to which 0.5 g Zytel ® 101 (additive-free nylon 66) had been added rather than masterbatch finished at 77 RV making the net catalytic effect of the masterbatch +27 RV units.

EXAMPLE 9

Masterbatch by Addition of Catalyst to Aqueous 66 Nylon Salt, 200 moles of Diethyl 2-(2'-Pyridyl)ethylphosphonate/$10^6$ g An aqueous solution of 16350 g of nylon 66 salt in 15400 ml of water was prepared and held at ~35° C. to prevent precipitation of the salt from the water. About 2/3 of this salt solution was loaded into a 20 gallon autoclave. This was followed by 51.6 g of 79% aqueous hexamethylenediamine, 1.15 g of a standard silicone antifoam, and finally 686 g of diethyl 2-(2'pyridyl)-ethylphosphonate (DPEP) for a DPEP concentration of 200 moles/$10^6$ of nylon. The remaining about ⅓ of the starting nylon 66 salt solution was then added and the autoclave thoroughly purged with nitrogen. The contents of the autoclave were stirred mechanically as the reaction mixture was heated to 213° to 214° C. over 70 to 115 minutes, bringing pressure to 250 psi. Temperature was further increased over the next 100 to 110 minutes to 240° C. with any pressure in excess of ~250 psi being vented. Pressure was then gradually reduced to atmospheric over 90 minutes with additional heating to 269° to 271° C. The polymer in the autoclave was stirred another 30 minutes finishing at 272° C. while venting any steam in excess of atmospheric pressure. Extrusion of the polymer through a blanketing nitrogen gap into water gave ribbon that was chopped and dried yielding about 13,000 to 15,000 g of flake. Four identical runs gave polymer with RV's of 27, 28, 29, and 27 for an average RV of 28.

EXAMPLE 10

Effect of Vacuum on Masterbatch RV, Masterbatch by Addition of Catalyst to Preformed Nylon, 400 moles of 2-(2'-Pyridyl)ethylphosphonic acid/$10^6$ g A Pyrex ® tube 200 mm long and 28 mm in inside diameter was loaded with 2 milliliters of water, 0.748 g of 2-(2~-pyridyl)ethylphosphonic acid (PEPA) for a concentration of 400 moles of PEPA/$10^6$ g of polymer, and 10 grams of additive free nylon 66 (Zytel ® 101). The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at a rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. Then a vacuum of 200 mm was pulled. Ten minutes later the vacuum was replaced by argon at 760 mm, stirring was stopped, polymer was allowed to drain from the stirrer, and the tube transferred from the dimethylphthalate vapor bath to an ice water bath, quenching the reaction and breaking the glass tube. The recovered nylon was ground up to 4.45 g of coarse powder which was found to have a relative viscosity of 55. A comparable experiment in which no vacuum was pulled gave polymer with a RV of 18 (Table 1, Example 5). Thus pulling a vacuum does significantly increase RV.

EXAMPLE 11

Effect of Vacuum on Masterbatch RV Masterbatch by Addition of Catalyst to Aqueous 66 Nylon Salt, 200 moles of Diethyl 2-(2'-Pyridyl)ethylphosphonate/$10^6$ g An aqueous solution of 16350 g of nylon 66 salt in 15400 ml of water was prepared and held at ~35° C. to prevent precipitation of the salt from the water. About ⅔ of this salt solution was loaded into a 20 gallon autoclave. This was followed by 58.2 g of 70% aqueous hexamethylenediamine, 1.15 g of a standard silicone antifoam, and finally 686 g of diethyl 2-(2'pyridyl)-ethylphosphonate (DPEP) for a DPEP concentration of 200 moles/$10^6$ g of nylon. The remaining about ⅓ of the starting nylon 66 salt solution was then added and the autoclave thoroughly purged with nitrogen. The contents of the autoclave were stirred mechanically as the reaction mixture was heated to 213° to 214° C. over 125 minutes, bringing pressure to 250 psi. Temperature was further increased over the next 75 minutes to 240° C. with any pressure in excess of ~250 psi being vented. Pressure was then gradually reduced to atmospheric over 90 minutes with additional heating to 272° C. The polymer in the autoclave was stirred another 30 minutes finishing at 272° C. while venting any steam in excess of atmospheric pressure. Over the next 15 minutes pressure in the clave was gradually lowered to 200 mm. The polymer was then extruded through a blanketing nitrogen gap into water giving ribbon that was chopped and dried yielding about 12,000 g of flake with an RV of 65, compared to an RV of 28 without vacuum in Example 9. Once again as in Example 10, pulling a vacuum significantly increased masterbatch RV.

EXAMPLE 12

Polymerization of Nylon 66 Starting from Salt Comparing Phosphoric Acid TO PEPA

A one liter autoclave with a glass liner was loaded with 115.9 g of 51.5 wt % aqueous nylon 66 salt, 0.36 g of hexamethylenediamine, 8 μl of a silicone antifoam, and amidation catalyst at the levels shown in the table below. The autoclave was pressured to 50 psig with nitrogen and bleed to atmospheric 10 times. The contents of the clave were heated rapidly to 210° C. and then held at 250° C. for 120 minutes while bleeding steam pressure in excess of 250 psig. Over the next 90 minutes the autoclave temperature was gradually raised to 275° C. while dropping pressure to 2 psig. The contents of the clave were finally held at 275° C. for 30 minutes while bleeding off steam in excess of 2 psig. The clave was cooled, the contents chopped to flake, and the flake analyzed for molecular weight by SEC PLUS RALLS. The results of 10 runs are summarized in Table 4.

TABLE 4

| | Molecular Weight, SEC PLUS by RALLS* | | |
|---|---|---|---|
| Catalyst | Mn | Mw | Mz |
| 0.252 g H$_3$PO$_4$ (0.49 wt %) | 35,300 | 92,100 | 440,700 |
| 0.505 g H$_3$PO$_4$ (0.97 wt %) | 42,300 | 211,600 | 3,186,200 |
| 1.01 g H$_3$PO$_4$ (1.92 wt %) | 30,900 | 98,700 | 2,752,600 |
| 2.02 g H$_3$PO$_4$ (3.78 wt %) | 40,500 | 229,100 | 6,824,200 |
| 4.04 g H$_3$PO$_4$ (7.27 wt %) | 9,100 | 12,700 | 18,700 |
| 8.08 g H$_3$PO$_4$ (13.6 wt %) | 4,500 | 7,200 | 11,600 |
| 0.963 g PEPA (1.8 wt %) | 25,800 | 35,300 | 58,200 |
| 1.93 g PEPA (3.6 wt %) | 11,100 | 22,100 | 33,400 |
| 3.85 g PEPA (7.0 wt %) | 13,900 | 26,700 | 40,800 |
| 7.70 g PEPA (13.0 wt %) | 31,300 | 53,400 | 73,000 |
| COMMERCIAL NYLON (Zytel ® 101) | 21,000 | 35,000 | 55,300 |

*SEC PLUS by RALLS: Sample separated by size exclusion chromatography (SEC) and eluant analyzed by a right angle laser light scattering detector (RALLS) in addition to concentration and viscosity detectors.

In the above comparative autoclave processes PEPA concentrations were used from 1.8 to 13 wt percent relative to nylon 66, to roughly match the concentration limits for catalysts claimed in European Application No. 410,230 (0.05–20%, preferably 0.2–10 wt %).

In the present process, preferred PEPA levels are between about 100 and 400 moles/10$^6$ g of nylon (1.8 to 7 wt %), concentrated enough to be an efficient way to add catalyst but not so concentrated as to degrade the nylon matrix to oligomer.

As shown in the above table, 66 Nylons containing PEPA have molecular weight distributions similar to a commercial, additive-free control (Zytel ® 101) and also appear to be free of high molecular weight gel and/or branching. 66 Nylons containing phosphoric acid have much broader molecular weight distributions and are plagued with high molecular weight gel or branched polymer (e.g., the Mz's over 400,000).

What is claimed is:

1. In a process for the manufacture of nylon, wherein lower molecular weight primary polyamides are converted to higher molecular weight secondary polyamides by melt blending the primary polyamides with one or more amidation catalysts, the improvement consisting of adding to the primary polyamide melt at least one catalyst masterbatch manufactured from an amidation catalyst mixed with nylon 66.

2. The process of claim 1 wherein the concentration of amidation catalyst in the masterbatch is 50 to 400 moles/10$^6$ g nylon 66.

3. The process of claim 1 wherein amidation catalyst in the masterbatch is blended into process melt flake or mixed with nylon 66 salt strike.

4. The process of claim 1 wherein said amidation catalyst is selected from the group consisting of 2-(2'-pyridyl)ethylphosphonic acid, and 2-aminoethylphosphonic acid, X(CH$_2$)$_n$PO$_3$R$_2$, wherein X is selected from the group consisting of 2-pyridyl, —NH$_2$, —NHR', and —NR'$_2$, n is 2 to 5 and R and R' independently are H or alkyl.

5. The process of claim 1 wherein said amidation catalyst is selected from the group consisting of aminoalkylphosphonic acid and pyridylalkylphosphonic acid.

6. The process of claim 5 wherein the catalyst is an aminoalkylphosphonic acid.

7. The process of claim 5 wherein the catalyst is a pyridylalkylphosphonic acid.

8. The process of claim 1 wherein the process is conducted in an autoclave or as a continuous process.

9. In a process for the manufacture of nylon, wherein lower molecular weight primary polyamides are converted to higher molecular weight secondary polyamides by melt blending the primary polyamides with one or more amidation catalysts, the improvement consisting of adding to the polyamide melt at least one catalyst masterbatch manufactured from an amidation catalyst mixed with nylon 66, wherein the catalyst masterbatch is added to the primary polyamide melt by strand feeding.

10. The process of claim 1 wherein the catalyst masterbatch is added to the primary polyamide melt by flake feeding.

* * * * *